United States Patent
Hayashi et al.

(10) Patent No.: US 7,955,427 B2
(45) Date of Patent: Jun. 7, 2011

(54) INKJET AQUEOUS INK AND PRINTED ITEM

(75) Inventors: Akiko Hayashi, Wakaguri (JP); Yoshiaki Ishimaru, Wakaguri (JP)

(73) Assignee: Riso Kagaku Corporation, Tokyo (JP)

( * ) Notice: Subject to any disclaimer, the term of this patent is extended or adjusted under 35 U.S.C. 154(b) by 78 days.

(21) Appl. No.: 12/453,868

(22) Filed: May 26, 2009

(65) Prior Publication Data

US 2010/0015413 A1   Jan. 21, 2010

(30) Foreign Application Priority Data

Jul. 18, 2008   (JP) ................................. 2008-186742

(51) Int. Cl.
*C09D 11/02* (2006.01)
(52) U.S. Cl. .................................................. 106/31.86
(58) Field of Classification Search ................ 106/31.86
See application file for complete search history.

(56) References Cited

U.S. PATENT DOCUMENTS 5,965,634 A * 10/1999 Idogawa et al. ............... 523/161
6,676,736 B2 * 1/2004 Nakano et al. ............. 106/31.58

FOREIGN PATENT DOCUMENTS

JP   2005-220296   8/2005

* cited by examiner

*Primary Examiner* — Jerry Lorengo
*Assistant Examiner* — Veronica F Faison Gee
(74) *Attorney, Agent, or Firm* — The Nath Law Group; Jerald L. Meyer; Jiaxiao Zhang

(57) ABSTRACT

An inkjet aqueous ink that prevents paper deformation and exhibits superior print quality and latency. The inkjet aqueous ink contains not less than 15% by mass and not more than 40% by mass of a polyglycerol having an average polymerization degree of 4 or greater, not less than 5% by mass and not more than 20% by mass of at least one of 1,3-propanediol and diethylene glycol monoethyl ether, and not less than 40% by mass and not more than 60% by mass of water.

8 Claims, No Drawings

INKJET AQUEOUS INK AND PRINTED ITEM

CROSS REFFERENCE TO RELATED APPLICATIONS

This application is based upon and claims the benefit of priority from prior Japanese Patent Application No. 2008-186742 field on Jul. 18, 2008; the entire contents of which are incorporated by reference herein.

TECHNICAL FIELD

The present invention relates to an inkjet aqueous ink and a printed item.

BACKGROUND ART

In inkjet printing, printing is conducted by spraying a liquid ink with a high degree of fluidity from very fine nozzles, and adhering that ink to a recording medium such as a sheet of paper. This type of inkjet printing enables the printing of high-resolution, high-quality images at high speed and with minimal noise, using a comparatively inexpensive printing apparatus, and is rapidly becoming widespread. Inkjet printing is conducted mainly using thermal systems that use heat to spray the ink, piezo systems that use application of a vibration to spray the ink, and electrostatic systems and the like.

In terms of the inks for these inkjet systems, aqueous type inks are becoming more prevalent, as they are capable of producing high-quality printed items at low cost. Aqueous inks are inks in which water has been included to enhance the drying properties, and compared with oil-based inks, offer the advantages of resistance to show-through (penetration of the ink through to the underside of the recording medium) even if double-sided printing is conducted onto plain paper, and favorable text reproducibility. The colorants used for these aqueous inks can be broadly classified into dyes and pigments, and pigment inks are rapidly gaining in popularity, as they offer superior levels of light resistance and water resistance.

Examples of problems that may occur when printing an aqueous ink onto paper such as plain paper include the phenomena of curling (convex curling) and cockling (wrinkling). These phenomena occur because the moisture within the aqueous ink causes cleavage of the hydrogen bonds between fibers within the paper, causing the paper to swell. If the paper deforms immediately following printing, then the printed sheets of paper may not align properly upon discharge from the printing apparatus, or if the degree of deformation is large, then the printed paper may become jammed inside the apparatus. These types of problems are more marked when the printing speed is high, such as for inkjet printers that employ a line head system. Furthermore, shortly after printing, the moisture that has penetrated into the paper begins to gradually evaporate, and this may cause deformation of the paper, and lead to problems in terms of handling and storage of the paper.

Furthermore, another known printing fault is the problem of satellites, which refers to small droplets that separate from the main ink droplets sprayed from the nozzles and are printed onto the paper as very fine specks. When air turbulence is caused inside the printing apparatus due to factors such as transporting of the paper, these small droplets can become suspended by the turbulent air flow, and may end up printed on the paper in the form of a wave-like pattern. This phenomenon is known as wave-like patterns.

Furthermore, aqueous inks also suffer from problems in terms of their performance when left to sit within an open system (hereafter referred to as "latency"). Namely, when an aqueous ink is left to sit in an open system exposed to the atmosphere, the water contained within the ink begins to evaporate, increasing the likelihood of aggregation of the solid matter such as pigments and the like within the ink, which may lead to solidification in the vicinity of the nozzles. If the nozzles become blocked with solid matter in this manner, then printing faults may occur.

Patent Document 1 discloses an inkjet aqueous ink, which contains a medium that exhibits specific levels of surface tension, viscosity and vapor pressure, and which exhibits improved recording head dischargeability and decap capabilities, as well as superior resistance to show-through, and excellent text quality and curling properties.

[Patent Document 1] Japanese Patent Laid-Open No. 2005-220296

DISCLOSURE OF INVENTION

Problems to be Solved by the Invention

However, currently, preventing paper deformation while achieving favorable print quality and superior latency is very difficult. In Patent Document 1, the ink becomes prone to exhibiting inferior latency, particularly in those cases where a pigment is used as the colorant, and if the ink is introduced into the printer head and then left to sit inside the head, the print nozzles become prone to blockages. Furthermore, in Patent Document 1, because the ink includes a large quantity of a low polarity water-soluble solvent, the ink tends to be prone to printing faults such as satellites and wave-like patterns.

Accordingly, an object of the present invention is to provide an inkjet aqueous ink that prevents paper deformation and exhibits superior print quality and ink latency.

Means to Solve the Problems

A first aspect of the present invention is an inkjet aqueous ink comprising not less than 15% by mass and not more than 40% by mass of a polyglycerol having an average polymerization degree of 4 or greater, not less than 5% by mass and not more than 20% by mass of at least one of 1,3-propanediol and diethylene glycol monoethyl ether, and not less than 40% by mass and not more than 60% by mass of water.

A second aspect of the present invention is a printed item printed using the above inkjet aqueous ink.

Effect of the Invention

The present invention is able to prevent paper deformation while maintaining superior print quality and ink latency.

BEST MODE FOR CARRYING OUT THE INVENTION

Embodiments according to the present invention are described below, but the examples in the following embodiments in no way limit the present invention.

An inkjet aqueous ink of the present invention comprises not less than 15% by mass and not more than 40% by mass of a polyglycerol having an average polymerization degree of 4 or greater, not less than 5% by mass and not more than 20% by mass of at least one of 1,3-propanediol (1,3-PDO) and diethylene glycol monoethyl ether (DEGEE) (hereafter frequently abbreviated as "1,3-PDO or the like"), and not less than 40% by mass and not more than 60% by mass of water.

In the present invention, as a result of investigating a multitude of organic solvents and combinations of those solvents for use as the solvent incorporated within an inkjet aqueous ink, it was discovered that by combining a polyglycerol having an average polymerization degree of 4 or greater with at least one of 1,3-propanediol and diethylene glycol monoethyl ether, not only could paper deformation be prevented, but favorable levels of print quality and ink latency could also be achieved.

According to the inkjet aqueous ink of the present invention, paper deformation can be prevented from immediately following printing right through until a long time following printing. Because paper deformation immediately following printing can be effectively prevented, the occurrence of paper jams inside the printing apparatus can be reduced, and printed sheets of paper can be aligned correctly when stacked upon discharge from the apparatus. Furthermore, because paper deformation can be prevented for a long time after printing, the handling, storage and maintenance of the paper can be easy.

In particular, because the degree of paper deformation immediately following printing is very small, the inkjet aqueous ink of the present invention can be favorably used for inkjet printing that uses high-speed line head systems. In other words, in a line head system, both the printing speed and the paper travel speed are very fast, which tends to cause problems such as paper jams at the printing apparatus, in particular at the inkjet head, or even if this type of paper transport fault does not occur, at least poor alignment of the discharged sheets of paper, but these problems can be alleviated by the present invention. For example, the inkjet aqueous ink of the present invention is compatible with high-speed printing of 120 pages per minute, and can therefore be used favorably within high-speed line head inkjet printers.

Furthermore, according to the inkjet aqueous ink of the present invention, because a combination of a polyglycerol and 1,3-PDO or the like is used, the quantity of low polarity water-soluble solvents such as ether-based solvents within the ink can be reduced, resulting in more favorable print quality with fewer printing faults such as satellites and wave-like patterns.

Moreover, according to the inkjet aqueous ink of the present invention, because evaporation of the water within the ink is suppressed, enabling the ink latency to be maintained at favorable levels, the problem of solid matter generated by ink solidification adhering to the nozzle units can be prevented. As a result, the ink can be discharged properly from the nozzles, thus preventing printing defects.

Furthermore, because the inkjet aqueous ink of the present invention exhibits favorable latency, maintenance of the head unit of the inkjet head can be executed in an appropriate manner. For example, in a configuration where the nozzle surface on which the nozzle units are disposed is wiped using a member known as a wipe blade, if solid matter adheres to the wipe blade, then the next time the nozzle surface is wiped, the solid matter adhered to the wipe blade may cause blocking of the nozzle units. In the present invention, in order to prevent ink solidification, the quantity of solid matter adhered to the wipe blade is reduced, thus preventing the solid matter from adhering to the nozzle units.

The inkjet aqueous ink of the present invention comprises not less than 15% by mass and not more than 40% by mass of a polyglycerol having an average polymerization degree of 4 or greater.

The average polymerization degree of the polyglycerol is preferably 4 or greater, and is more preferably 6 or greater. A value that satisfies this range not only suppresses paper deformation, but also improves the print quality and the ink latency. In particular, including a polyglycerol having an average polymerization degree of 4 or greater can effectively prevent paper deformation immediately following printing. The average polymerization degree can be determined from the hydroxyl value.

As the average polymerization degree of the polyglycerol increases, the viscosity of the entire ink tends to increase, but this increase in viscosity can be controlled by adjusting the proportion of low viscosity components such as the 1,3-PDO or the like and water within the ink.

The quantity of the polyglycerol relative to the total mass of the ink is preferably not less than 15% by mass, more preferably not less than 20% by mass, and still more preferably 25% by mass or greater. Moreover, the quantity of the polyglycerol relative to the total mass of the ink is preferably not more than 40% by mass, and is more preferably 30% by mass or less. A quantity within this range not only prevents paper deformation, but also improves the print quality and the ink latency, while ensuring that the effects of the other components can still be effectively realized.

In particular, ensuring that the quantity of the above polyglycerol is not less than 15% by mass favorably prevents paper deformation, and particularly paper deformation immediately following printing. Furthermore, by limiting the quantity of the polyglycerol to not more than 40% by mass, the moisture retention and viscosity of the overall ink can be maintained at appropriate levels.

The inkjet aqueous ink of the present invention also contains not less than 5% by mass and not more than 20% by mass of at least one of 1,3-propanediol and diethylene glycol monoethyl ether.

In the present invention, it was discovered that the combination of the aforementioned polyglycerol with at least one of 1,3-propanediol and diethylene glycol monoethyl ether was effective in suppressing paper deformation and achieving favorable levels of print quality and ink latency.

The 1,3-propanediol and diethylene glycol monoethyl ether may each be used as individual components, or may be used in combination. If used in combination, there are no particular limitations on the proportion of each component within the combination.

The quantity of the 1,3-PDO or the like relative to the total mass of the ink is preferably not less than 5% by mass. Moreover, the quantity of the 1,3-PDO or the like relative to the total mass of the ink is preferably not more than 20% by mass, and is more preferably 10% by mass or less. A quantity within this range not only prevents paper deformation, but also improves the print quality and the ink latency, while ensuring that the effects of the other components, and in particular the polyglycerol described above, can still be effectively realized.

In particular, ensuring that the quantity of the 1,3-PDO or the like is not less than 5% by mass is effective in lowering the viscosity of the aforementioned polyglycerol, thereby improving the latency properties of the ink. Furthermore, by ensuring that the quantity of the 1,3-PDO or the like is not more than 20% by mass, the proportion of low polarity water-soluble solvents within the total mass of the ink can be reduced, which enables printing faults such as satellites and wave-like patterns to be prevented.

The inkjet aqueous ink of the present invention also contains not less than 40% by mass and not more than 60% by mass of water.

Although there are no particular limitations on the water, water containing minimal impurities, including pure water and ultra pure water such as ion-exchanged water and distilled water is preferred.

The quantity of the water relative to the total mass of the ink is preferably not less than 40% by mass, more preferably not less than 45% by mass, and still more preferably 50% by mass or greater. Moreover, the quantity of the water relative to the total mass of the ink is preferably not more than 60% by mass, and is more preferably 55% by mass or less. A quantity within this range ensures favorable evaporation of the water fraction from ink printed onto paper, thus retaining the ready drying characteristic of an aqueous ink, while ensuring that the effects of the other components, and in particular the polyglycerol and 1,3-PDO or the like described above, can still be effectively realized. In particular, ensuring that the water content is not more than 60% by mass is ideal for ensuring ready drying when the ink is printed onto paper, favorable suppression of paper deformation, and applicability to high-speed transport of the paper. Moreover, restricting the water content to not more than 55% by mass enables the paper to be transported favorably at high speed even when the paper has been printed with an image having a high print ratio.

Furthermore, if the ink is left to sit in an open system, then if the ink contains water in excess of 60% by mass, the increased water content of the ink causes a deterioration in the water retention and a reduction in the viscosity of the ink, and the quantity of evaporated water relative to the total mass of the ink tends to increase. If this type of ink is left to sit in an open system, then the water within the ink evaporates readily, and as a result of the reduced water content, the resulting ink from which the water has evaporated tends to be prone to aggregation and solidification of the solid matter such as pigments within the ink. This is another reason that the quantity of water is preferably regulated to a value within the range specified above.

Examples of pigments that can be used in the inkjet aqueous ink of the present invention include organic pigments such as azo-based pigments, phthalocyanine-based pigments, dye-based pigments, condensed polycyclic pigments, nitro-based pigments, and nitroso-based pigments (such as brilliant carmine 6B, lake red C, Watchung red, disazo yellow, Hansa yellow, phthalocyanine blue, phthalocyanine green, alkali blue and aniline black); inorganic pigments, including metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black, and channel black. These pigments may be used either alone, or in combinations of two or more different pigments.

Moreover, the pigment used in the inkjet aqueous ink of the present invention is preferably a self-dispersing pigment.

The self-dispersing pigment is preferably a pigment in which hydrophilic functional groups have been introduced at the surface of the pigment via a chemical or physical treatment. The hydrophilic functional groups introduced into the self-dispersing pigment preferably exhibit ionic properties, meaning that by charging the surface of the pigment by imparting the surface with anionic or cationic properties, electrostatic repulsive forces can be used to disperse the pigment particles stably within the water. Furthermore, in the present invention, because the ink latency is favorable and evaporation of the water content is suppressed, ionic pigments can be stored within the ink in a stable manner. Examples of preferred anionic functional groups include a sulfonic acid group, carboxyl group, carbonyl group, hydroxyl group, and phosphonic acid group. Examples of preferred cationic functional groups include a quaternary ammonium group and a quaternary phosphonium group.

These hydrophilic functional groups may be bonded directly to the pigment surface, or may be bonded to the surface via other groups of atoms. Examples of these other groups of atoms include alkylene groups, phenylene groups and naphthylene groups, although this is not an exhaustive list. Examples of methods of treating the pigment surface include a diazotization treatment, sulfonation treatment, hypochlorination treatment, humic acid treatment and vacuum plasma treatment.

The quantity (solid fraction) of the pigment contained within the inkjet aqueous ink of the present invention, relative to the total mass of the ink, is preferably not less than 3% by mass, more preferably not less than 4% by mass, and still more preferably 5% by mass or higher, but is preferably not more than 15% by mass, more preferably not more than 12% by mass, and still more preferably 10% by mass or less. Ensuring that the pigment content is not less than 3% by mass enables the coloration and color development of the colorant to be favorably maintained, thereby ensuring appropriate image density. Furthermore, by ensuring that the pigment content is not more than 15% by mass, aggregation of the pigment particles can be suppressed, and the viscosity of the ink can be regulated at an appropriate level, enabling favorable ink latency properties to be obtained.

The ideal range for the viscosity of the inkjet aqueous ink of the present invention varies depending on factors such as the diameter of the nozzles within the inkjet head and the discharge environment, but at 23° C., is preferably within a range from 1 to 30 mPa·s, more preferably from 5 to 15 mPa·s, and is further more preferably approximately 10 mPa·s. Here, the term "viscosity" describes a value measured at 23° C. by raising the shear stress from 0 Pa at a rate of 0.1 Pa/s, and refers to the measured value at 10 Pa.

If required, any of the various additives typically used within the field may be added to the inkjet aqueous ink of the present invention, provided the inclusion of these additives does not impair the object of the present invention.

Specifically, a surfactant may be added to the ink of the present invention as a pigment dispersant, antifoaming agent or surface tension reducing agent or the like. Examples of the surfactant include anionic surfactants such as aliphatic acid salts, esters of higher alcohols, alkylbenzenesulfonates, sulfosuccinates and higher alcohol phosphates, cationic surfactants such as aliphatic amine salts and quaternary ammonium salts, amphoteric surfactants such as amino acid-based and betaine-based surfactants, nonionic surfactants such as ethylene oxide adducts of higher alcohols, ethylene oxide adducts of alkylphenols, ethylene oxide adducts of polyhydric alcohol fatty acid esters, and acetylene glycol and ethylene oxide adducts thereof, as well as polymer-based, silicone-based or fluorine-based surfactants. Two or more of these surfactants may also be used in combination.

An electrolyte may also be added to the ink of the present invention to regulate the viscosity of the ink. Examples of these electrolytes include sodium sulfate, potassium hydrogen phosphate, sodium citrate, potassium tartrate and sodium borate, and two or more of these electrolytes may also be used in combination.

A pH regulator may also be added to the ink of the present invention to regulate the pH of the ink. Examples of compounds that may be added as the pH regulator include sulfuric acid, nitric acid, acetic acid, sodium hydroxide, potassium hydroxide, ammonium hydroxide and triethanolamine. Two or more of these compounds may also be used in combination. Further, these compounds may also be used as ink thickeners.

Furthermore, an antioxidant may also be added to the ink of the present invention to prevent oxidation of the ink components and improve the ink storage stability. Examples of antioxidants that may be added include L-ascorbic acid, sodium L-ascorbate, sodium isoascorbate, potassium sulfite, sodium sulfite, sodium thiosulfate, sodium dithionite and sodium pyrosulfite, and two or more of these antioxidants may also be used in combination.

A preservative may also be added to the ink of the present invention to prevent decomposition and improve the ink storage stability. Examples of the preservative include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

A printed item according to the present invention is an item printed using the inkjet aqueous ink described above. The inkjet printer used for performing the printing may employ any of various printing systems, including a thermal system, piezo system or electrostatic system or the like. The printer discharges the inkjet aqueous ink of the present invention from the inkjet nozzles based on a digital signal, and adheres the discharged ink droplets to a recording medium such as a sheet of paper. A printed item obtained in this manner suffers minimal paper deformation and exhibits favorable print quality.

EXAMPLES

A more detailed description of the present invention is provided below based on a series of examples, although the present invention is in no way limited by these examples.

Examples and Comparative Examples

The components shown in Table 1 were blended together to prepare inks of examples 1 and 2, and comparative examples 1 to 8. The method of preparation involved preparing a mixed liquid (1) of the pigment and water, gradually adding a mixed liquid (2) containing the remaining raw materials under constant stirring, and then filtering the resulting mixture through a 0.8 µm membrane filter. The components used are listed below.

Pigment: "CAB-O-JET 300" (a self-dispersing pigment dispersion, solid fraction: 15% by mass, manufactured by Cabot Corporation)

Glycerol (manufactured by Sakamoto Yakuhin Kogyo Co., Ltd.)

Diglycerol (manufactured by Sakamoto Yakuhin Kogyo Co., Ltd.)

PG #750 (a polyglycerol, average polymerization degree: 7, manufactured by Sakamoto Yakuhin Kogyo Co., Ltd.)

1,3-propanediol (manufactured by DuPont Corporation)

1,5-pentanediol (manufactured by Wako Pure Chemical Industries, Ltd.)

1,3-dimethylimidazolidinone (manufactured by Wako Pure Chemical Industries, Ltd.)

DEGEE (diethylene glycol monoethyl ether, manufactured by Wako Pure Chemical Industries, Ltd.)

TetEGBE (tetraethylene glycol butyl ether, manufactured by Kyowa Hakko Chemical Co., Ltd.)

TriEGBE (triethylene glycol butyl ether, manufactured by Wako Pure Chemical Industries, Ltd.)

Surfactant: "SURFINOL 465" (an acetylene glycol ethylene oxide, manufactured by Air Products and Chemicals Inc.)

pH regulator (triethanolamine, manufactured by Wako Pure Chemical Industries, Ltd.)

Evaluation of Properties

Next, each of the examples and comparative examples was evaluated for paper deformation, print quality and ink latency. The results of the evaluations are shown in Table 1.

(1) Paper Deformation Immediately Following Printing

Evaluation of the paper deformation immediately following printing was conducted using a line head-type line inkjet printer ORPHIS HC5500 (manufactured by Riso Kagaku Corporation). Using Riso lightweight paper (A4 size, manufactured by Riso Kagaku Corporation) as the paper, a solid image was printed onto the entirety of one side of each sheet of paper at a printing speed of 120 pages/minute, and after printing 20 copies, the alignment of the discharged sheets of paper was evaluated. The ink path within the ORPHIS HC5500 was partially modified to enable the printing of aqueous inks. An evaluation of "O" indicates no paper jams and favorable alignment of the discharged sheets of paper, whereas an evaluation of "×" indicates that although no paper jams occurred, the discharged sheets of paper were in a state of disarray.

(2) Paper Deformation Following Standing

In order to evaluate the paper deformation following standing, 20 printed items from the above evaluation of "(1) paper deformation immediately following printing" were stacked, the stack of paper was left to stand for 2 weeks in an environment at 23° C. and 50% RH, and the state of the printed items was then inspected. An evaluation of "O" indicates almost no deformation, whereas an evaluation of "×" indicates significant deformation.

(3) Print Quality

Evaluation of the print quality was conducted by mounting the inkjet head of the aforementioned ORPHIS HC5500 in a continuous discharge jig (a device in which any inkjet head may be mounted, and in which the drive conditions and the like can be set as desired). Using a discharge volume of 30 pl per dot, a solid image of 300 dpi (main scanning direction)× 150 dpi (sub-scanning direction) was printed, and the printed item was inspected for the presence of wave-like patterns. An evaluation of "O" indicates that no wave-like patterns were observed, whereas an evaluation of "×" indicates that wave-like patterns were observed.

(4) Ink Latency

Evaluation of the ink latency was evaluated by placing 10 ml of the ink in a 20 ml glass bottle, allowing the bottle to stand for 4 days in an open environment at 45° C. and 30% RH, and then visually evaluating the fluidity of the ink. An evaluation of "O" indicates that the ink exhibited fluidity, whereas an evaluation of "×" indicates no fluidity.

TABLE 1

| Component (% by mass) | | Example 1 | Example 2 | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|---|---|
| Pigment | COJ300 solid fraction | 8 | 8 | 8 | 8 | 8 | 8 | 8 | 8 | 8 | 8 |
| Organic solvent | Glycerol | — | — | 25 | — | — | — | 10 | 5 | 25 | — |
| | Diglycerol | — | — | — | — | — | 10 | — | 5 | — | — |
| | PG #750 | 30 | 25 | — | — | — | — | — | — | — | 34 |
| | 1,3-propanediol | 9 | 9 | 24 | — | — | — | — | — | — | — |
| | 1,5-pentanediol | — | — | — | — | — | — | — | — | 9 | — |
| | 1,3-dimethyl-imidazolidinone | — | — | — | — | 10 | — | — | — | — | — |
| | DEGEE | — | — | — | — | — | — | — | 19 | — | — |
| | TetEGBE | — | — | — | — | — | 29 | 29 | 20 | — | — |
| | TriEGBE | — | — | — | 49 | 39 | — | — | — | — | — |
| Water | Ion-exchanged water | 50 | 55 | 40 | 40 | 40 | 50 | 50 | 40 | 55 | 55 |
| Surfactant | SURFINOL 465 | 2 | 2 | 2 | 2 | 2 | 2 | 2 | 2 | 2 | 2 |
| pH regulator | triethanolamine | 1 | 1 | 1 | 1 | 1 | 1 | 1 | 1 | 1 | 1 |
| | Total | 100 | 100 | 100 | 100 | 100 | 100 | 100 | 100 | 100 | 100 |
| Paper deformation | Paper alignment immediately after printing | ○ | ○ | X | ○ | ○ | ○ | ○ | ○ | X | ○ |
| | Paper deformation after standing for 2 weeks | ○ | ○ | X | ○ | ○ | ○ | ○ | ○ | ○ | ○ |
| Print quality | Wave-like patterns | ○ | ○ | ○ | X | X | X | X | X | ○ | ○ |
| Ink latency | Fluidity | ○ | ○ | ○ | X | X | X | X | X | ○ | X |

As shown in Table 1, the examples 1 and 2 contained both the polyglycerol and the 1,3-propanediol specified in the present invention, and the paper deformation, print quality and ink latency properties were superior to those of the comparative examples 1 to 8. Namely, it was found that the inks of the examples 1 and 2 prevented paper deformation, and were therefore compatible with high-speed line head systems, and also prevented printing defects such as wave-like patterns, meaning the print quality was good. Furthermore, it was also found that because the ink latency was favorable, deterioration of the ink over time was able to be suppressed, meaning ink blockages at the inkjet nozzles and contamination of the inkjet nozzle surface could be prevented.

In comparison, the comparative examples 1 and 7 contained glycerol rather than polyglycerol, and therefore paper deformation, and particularly paper deformation immediately following printing, was poor. Furthermore, the comparative examples 2 to 6 contained an ether-based solvent rather than polyglycerol, and although the paper deformation properties were favorable, the print quality and ink latency were unsatisfactory. The comparative example 8 contained polyglycerol but did not contain 1,3-PDO or the like, and the ink latency was poor.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. An inkjet aqueous ink comprising not less than 15% by mass and not more than 40% by mass of a polyglycerol having an average polymerization degree of 7 or greater, not less than 5% by mass and not more than 20% by mass of 1,3-propanediol, and not less than 40% by mass and not more than 60% by mass of water.

2. The inkjet aqueous ink according to claim 1, further comprising not less than 3% by mass and not more than 15% by mass of a self-dispersing pigment.

3. The inkjet aqueous ink according to claim 1, which is utilized in line head-type inkjet printing.

4. The inkjet aqueous ink according to claim 2, which is utilized in line head-type inkjet printing.

5. A printed item, printed utilizing the inkjet aqueous ink according to claim 1.

6. The printed item according to claim 5, wherein the inkjet aqueous ink further comprises not less than 3% by mass and not more than 15% by mass of a self-dispersing pigment.

7. The printed item according to claim 5, wherein the inkjet aqueous ink is utilized in line head-type inkjet printing.

8. The printed item according to claim 6, wherein the inkjet aqueous ink is utilized in line head-type inkjet printing.

* * * * *